(12) United States Patent
Lin

(10) Patent No.: US 7,500,759 B2
(45) Date of Patent: Mar. 10, 2009

(54) RETRACTABLE LIGHTING DEVICE FOR BARBECUE STOVE

(76) Inventor: Chun-Cheng Lin, No. 5, Alley 68, Lane 538, Shunangwun Rd., Dali City, Taichung County 412 (TW)

( * ) Notice: Subject to any disclaimer, the term of this patent is extended or adjusted under 35 U.S.C. 154(b) by 147 days.

(21) Appl. No.: 11/599,985

(22) Filed: Nov. 16, 2006

(65) Prior Publication Data

US 2008/0117621 A1    May 22, 2008

(51) Int. Cl.
*F21V 19/02*      (2006.01)
*A47J 37/07*      (2006.01)

(52) U.S. Cl. ............... 362/33; 362/92; 362/198; 362/250; 362/285

(58) Field of Classification Search ............ 362/33, 362/86, 92, 198, 250, 285, 429, 430; 99/341
See application file for complete search history.

(56) References Cited

U.S. PATENT DOCUMENTS

| | | | | |
|---|---|---|---|---|
| 2,470,645 A | * | 5/1949 | Reichart | ............ 362/92 |
| 2,667,323 A | * | 1/1954 | Mason | ............ 362/418 |
| 5,257,169 A | * | 10/1993 | Walendziak | ............ 362/92 |
| 5,664,875 A | * | 9/1997 | Hegedus | ............ 362/92 |
| 6,073,623 A | * | 6/2000 | Maschhoff | ............ 362/92 |
| 6,132,055 A | * | 10/2000 | Grisamore et al. | ............ 362/92 |
| 6,935,327 B1 | * | 8/2005 | Williams et al. | ............ 362/92 |
| 7,008,072 B2 | * | 3/2006 | Witzel et al. | ............ 362/92 |
| 7,168,363 B1 | * | 1/2007 | Brown | ............ 126/25 R |
| 2001/0033484 A1 | * | 10/2001 | Gilley | ............ 362/92 |
| 2003/0111070 A1 | * | 6/2003 | DeMars | ............ 362/92 |
| 2004/0001334 A1 | * | 1/2004 | Choi et al. | ............ 362/92 |
| 2005/0155597 A1 | * | 7/2005 | Wolter et al. | ............ 362/92 |

* cited by examiner

*Primary Examiner*—Ismael Negron
(74) *Attorney, Agent, or Firm*—Banger Shia

(57) ABSTRACT

A lighting device for a barbecue stove includes a handle assembly, and a lamp assembly retractably mounted on the handle assembly. The handle assembly includes two spaced fixing seats, and an elongate hollow handle. The lamp assembly includes a guide track, a slide, a receiving seat, a lighting seat, and a flexible pipe.

18 Claims, 9 Drawing Sheets

RETRACTABLE LIGHTING DEVICE FOR BARBECUE STOVE

BACKGROUND OF THE INVENTION

1. Field of the Invention

The present invention relates to a lighting device, and more particularly to a foldable lighting device for a barbecue stove.

2. Description of the Related Art

A conventional barbecue stove comprises an upright support, a stove body mounted on a top of the support, a lid removably mounted on a top of the stove body, a control panel mounted on a front portion of the stove body, and a plurality of control knobs rotatably mounted on the control panel. However, the conventional barbecue stove is not provided with a lighting device to provide a lighting effect, so that the conventional barbecue stove is not available for use at a darker place.

SUMMARY OF THE INVENTION

The present invention is to mitigate and/or obviate the disadvantage of the conventional barbecue stove.

The primary objective of the present invention is to provide a foldable lighting device for a barbecue stove to provide an illuminating effect.

Another objective of the present invention is to provide a lighting device, wherein the lamp assembly is retracted into and stored in the handle assembly when not in use, so that the lamp assembly does not occupy any space, thereby facilitating a user storing the lamp assembly.

A further objective of the present invention is to provide a lighting device, wherein the flexible pipe of the lamp assembly is pulled outwardly from the guide track, so that the lamp assembly is expanded outwardly from the handle assembly easily and quickly, thereby facilitating the user storing the lamp assembly.

In accordance with the present invention, there is provided a lighting device, comprising a handle assembly, and a lamp assembly retractably mounted on the handle assembly. The handle assembly includes two spaced fixing seats, and an elongate hollow handle mounted between the fixing seats and having two ends each inserted into a respective fixing seat. The lamp assembly includes a guide track mounted in the handle of the handle assembly, a slide slidably mounted in the guide track, a receiving seat mounted on a respective fixing seat of the handle assembly, a lighting seat detachably mounted in the receiving seat, and a flexible pipe movably mounted in the guide track and having a first end attached to the lighting seat to move with the lighting seat and a second end attached to the slide to move the slide.

Further benefits and advantages of the present invention will become apparent after a careful reading of the detailed description with appropriate reference to the accompanying drawings.

DETAILED DESCRIPTION OF THE INVENTION

Figure 1:
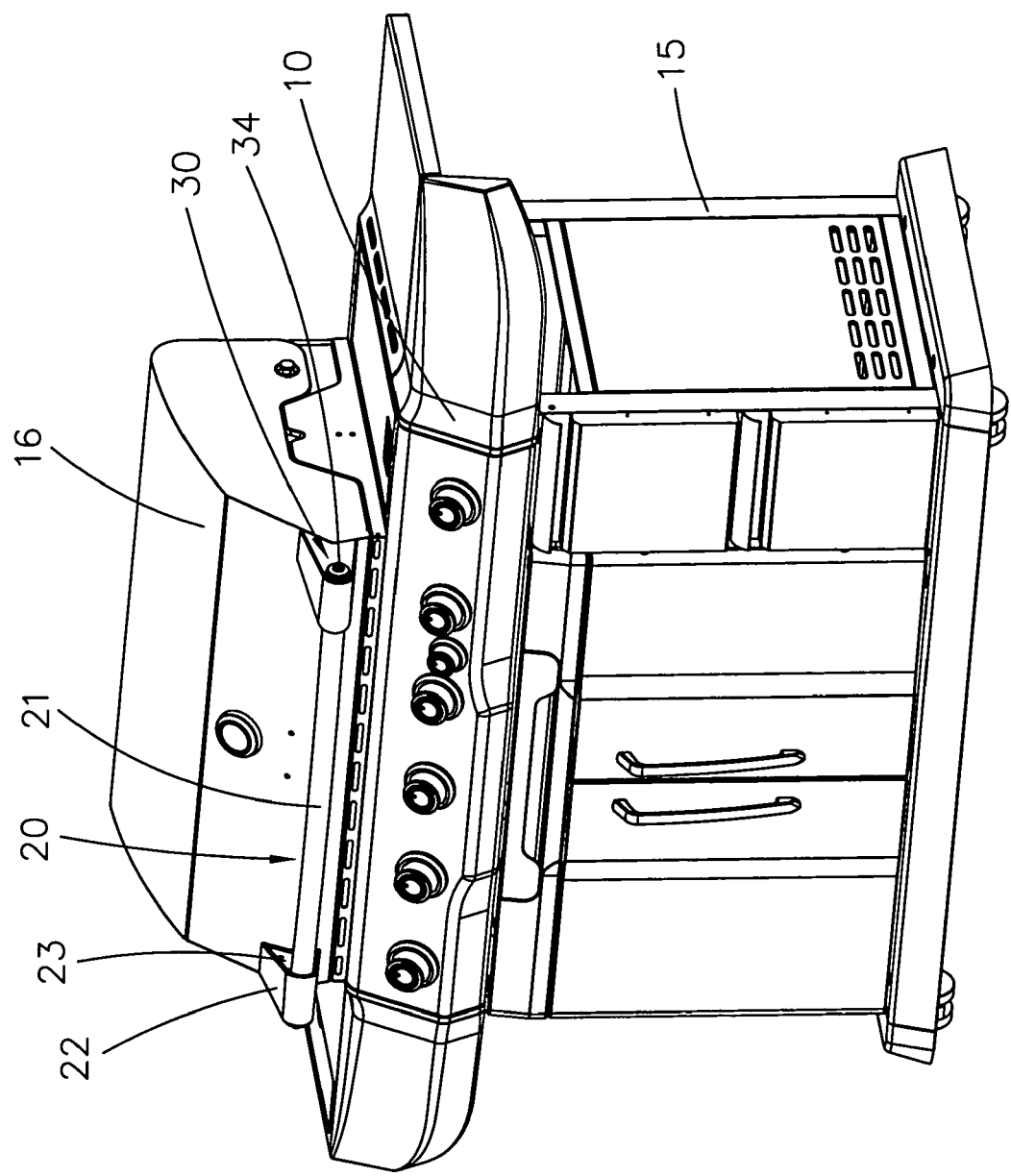
FIG. 1 is a perspective view of a barbecue stove in accordance with the preferred embodiment of the present invention.

Referring to the drawings and initially to FIGS. 1-5, a lighting device in accordance with the preferred embodiment of the present invention is mounted on a barbecue stove to provide a lighting or illuminating effect.

The barbecue stove includes an upright support 15, a stove body 10 mounted on a top of the support 15, and a lid 16 removably mounted on a top of the stove body 10.

The lighting device comprises a handle assembly 20 mounted on the lid 16 of the barbecue stove, and a lamp assembly 30 retractably mounted on the handle assembly 20.

The handle assembly 20 includes two spaced fixing seats 22 each secured on the lid 16 of the barbecue stove, an elongate hollow handle 21 mounted between the fixing seats 22 and having two ends each inserted into a respective fixing seat 22, and two cover plates 23 each mounted in a respective fixing seat 22 and each rested on a respective end of the handle 21 to limit a position of the handle 21.

Each of the fixing seats 22 of the handle assembly 20 has an open inner face to receive the respective cover plate 23 and to allow insertion of the respective end of the handle 21.

The lamp assembly 30 is retractably mounted in at least one end of the handle 21 of the handle assembly 20. In the preferred embodiment of the present invention, the lamp assembly 30 is retractably mounted in each of the two ends of the handle 21 of the handle assembly 20.

The lamp assembly 30 includes a guide track 31 mounted in the handle 21 of the handle assembly 20, a slide 36 slidably mounted in the guide track 31, a receiving seat 33 mounted on a respective fixing seat 22 of the handle assembly 20, a lighting seat 34 detachably mounted in the receiving seat 33, and a flexible pipe 35 movably mounted in the guide track 31 and having a first end attached to the lighting seat 34 to move with the lighting seat 34 and a second end attached to the slide 36 to move the slide 36.

The guide track 31 of the lamp assembly 30 has a hollow shape and has a square cross-sectional profile. The guide track 31 of the lamp assembly 30 has a first end 310 fixed in an inner wall of a mediate portion of the handle 21 by a fixing plate 32.

The receiving seat 33 of the lamp assembly 30 has a hollow shape and has a first end 330 inserted into a second end 312 of the guide track 31 and an open second end 332 protruded outwardly from the respective fixing seat 22 of the handle assembly 20 to receive the lighting seat 34.

The lighting seat 34 of the lamp assembly 30 contains a plurality of electronic parts, such as a light emitting member, a power supply, a switch and the like. The lighting seat 34 of the lamp assembly 30 has a first end 340 secured to the first end of the flexible pipe 35 and a second end 342 protruded outwardly from the respective fixing seat 22 of the handle assembly 20.

The slide 36 of the lamp assembly 30 has a square cross-sectional profile so that the slide 36 is movable in and not rotatable relative to the guide track 31. The slide 36 of the lamp assembly 30 has a peripheral wall formed with a transverse through hole 360. The slide 36 of the lamp assembly 30 is slidable in the guide track 31 to rest on the first end 330 of the receiving seat 33 to prevent the flexible pipe 35 and the lighting seat 34 from being detached from the handle 21 of the handle assembly 20.

The second end of the flexible pipe 35 of the lamp assembly 30 is extended through the slide 36 and has a peripheral wall formed with a transverse through bore 350, and the lamp assembly 30 further includes a fixing pin 37 extended through the through hole 360 of the slide 36 and the through bore 350 of the flexible pipe 35 to attach the slide 36 to the flexible pipe 35.

Figure 2:
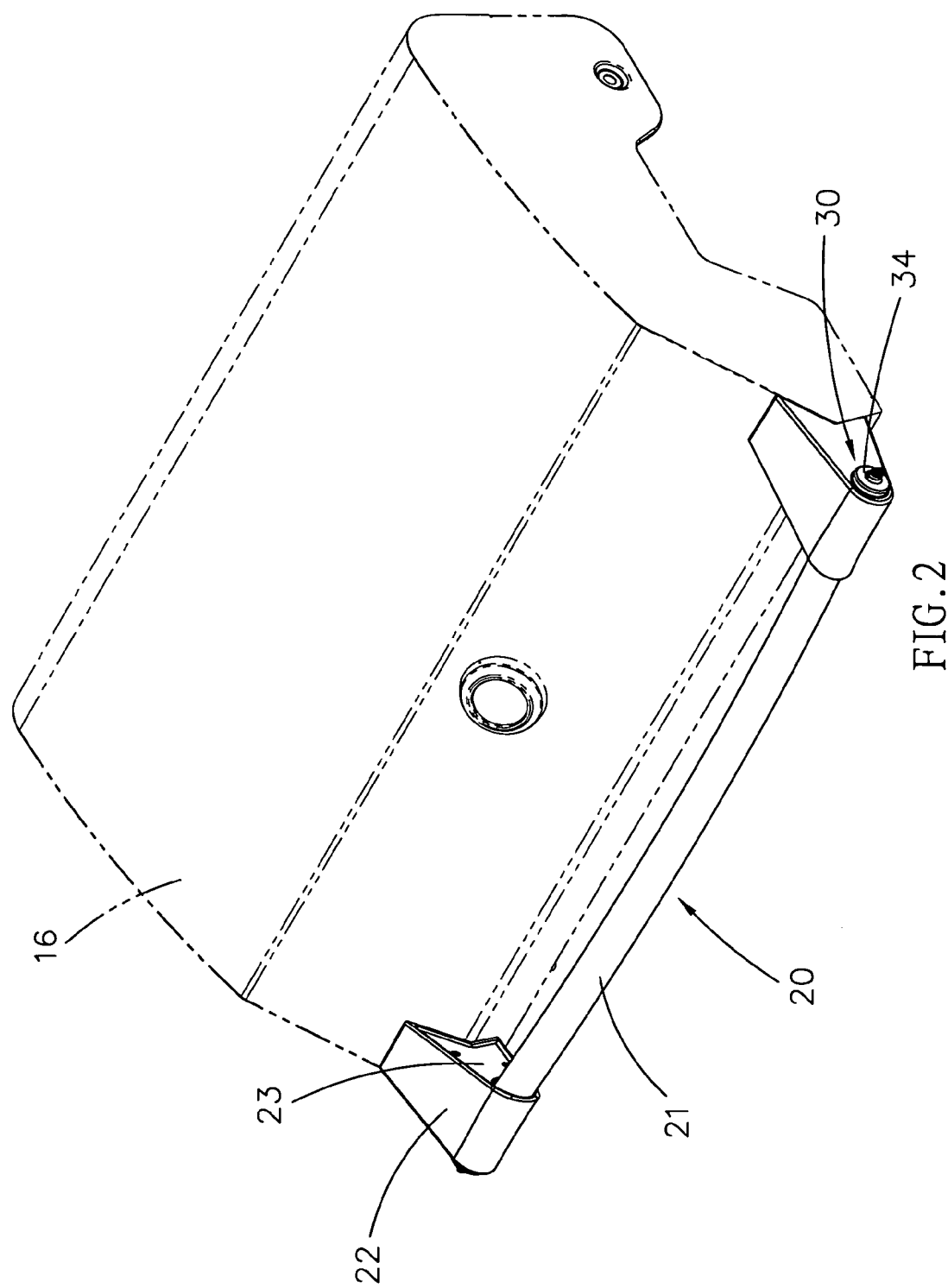
FIG. 2 is a perspective view of a lighting device for the barbecue stove as shown in FIG. 1.
Figure 3:
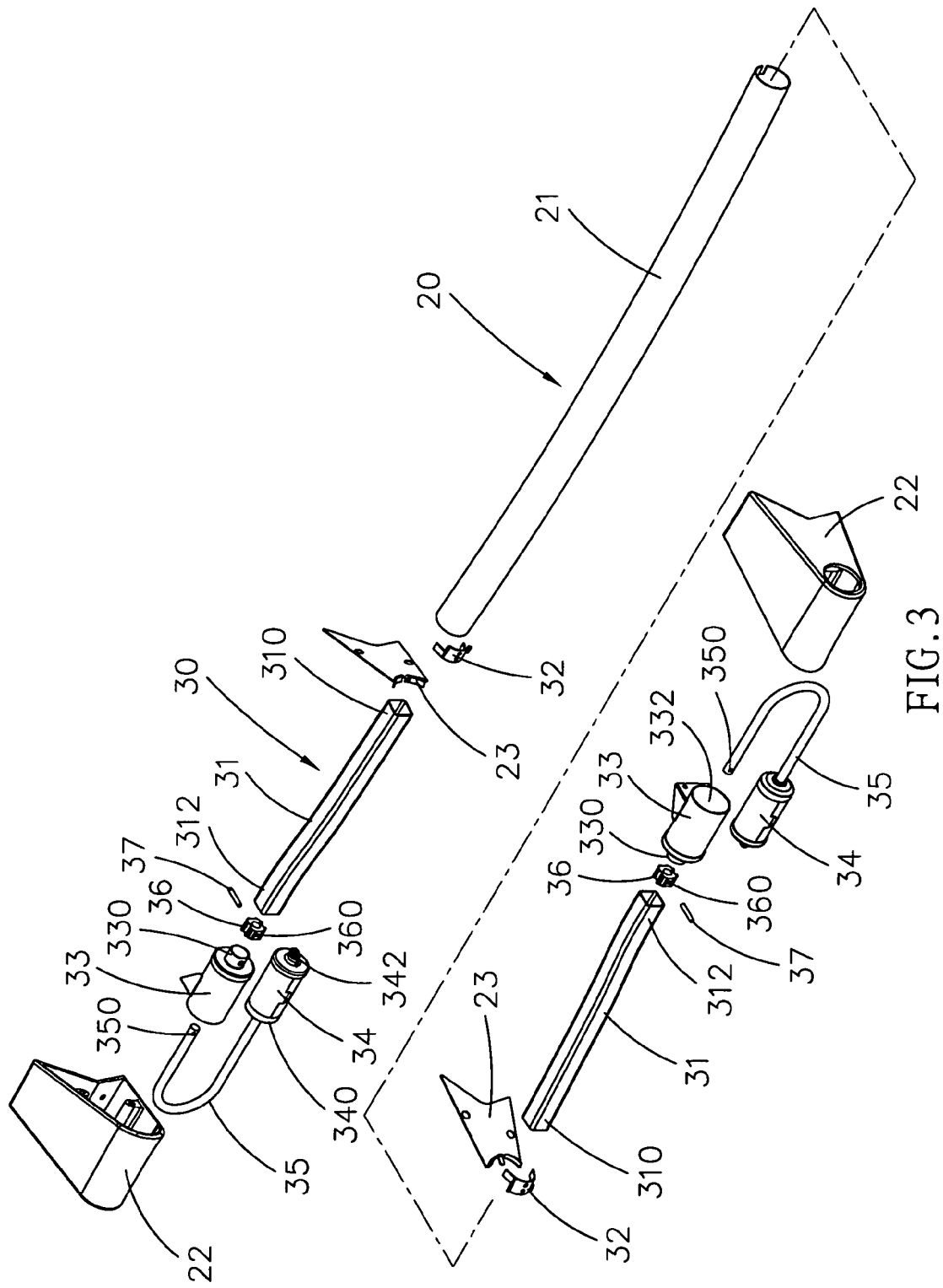
FIG. 3 is an exploded perspective view of the lighting device as shown in FIG. 2.
Figure 4:
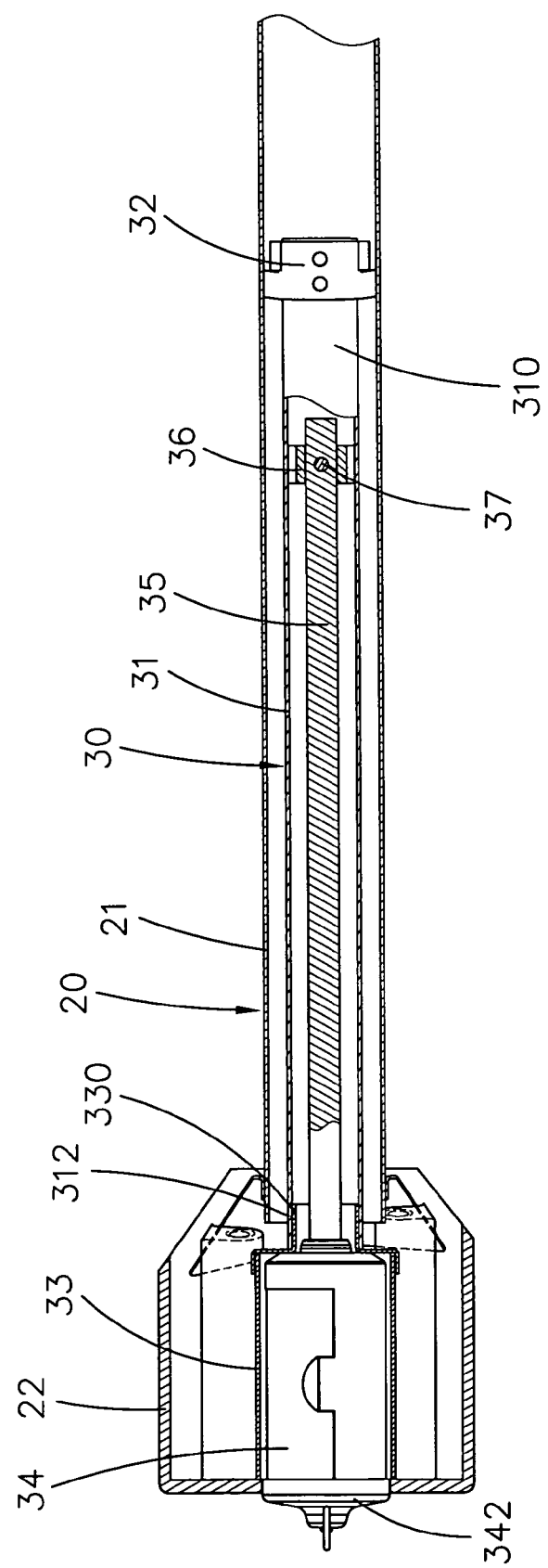
FIG. 4 is a partially plan cross-sectional view of the lighting device as shown in FIG. 2.
Figure 5:
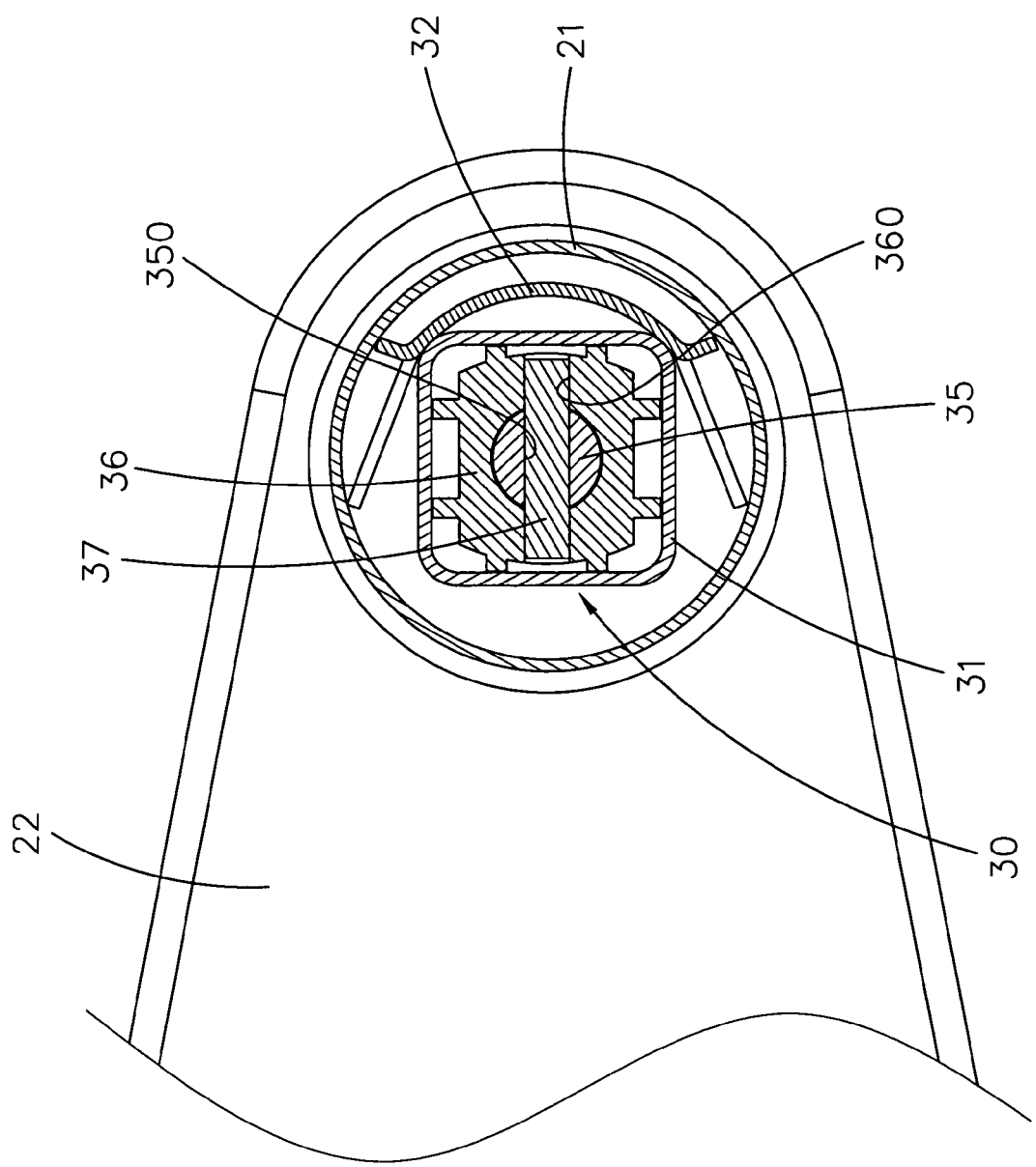
FIG. 5 is a partially plan cross-sectional view of the lighting device as shown in FIG. 2.

As shown in FIGS. 2 and 4, the flexible pipe 35 of the lamp assembly 30 is fully hidden in the guide track 31 when the lighting seat 34 of the lamp assembly 30 is mounted in the receiving seat 33, so that the lamp assembly 30 is retracted into and stored in the handle 21 of the handle assembly 20 when not in use, thereby facilitating a user storing the lamp assembly 30.

Figure 6:
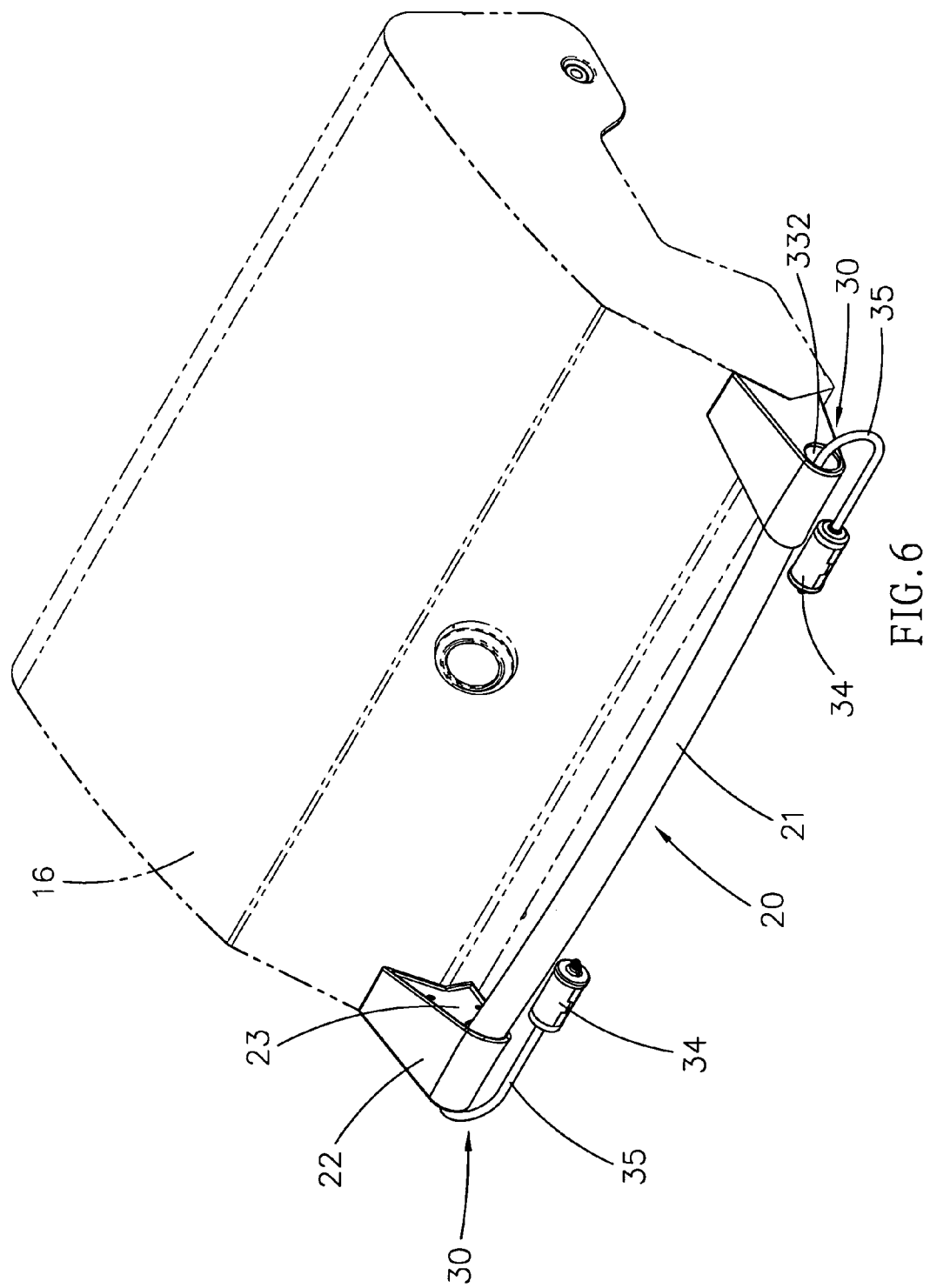
FIG. 6 is a schematic operational view of the lighting device as shown in FIG. 2.
Figure 7:
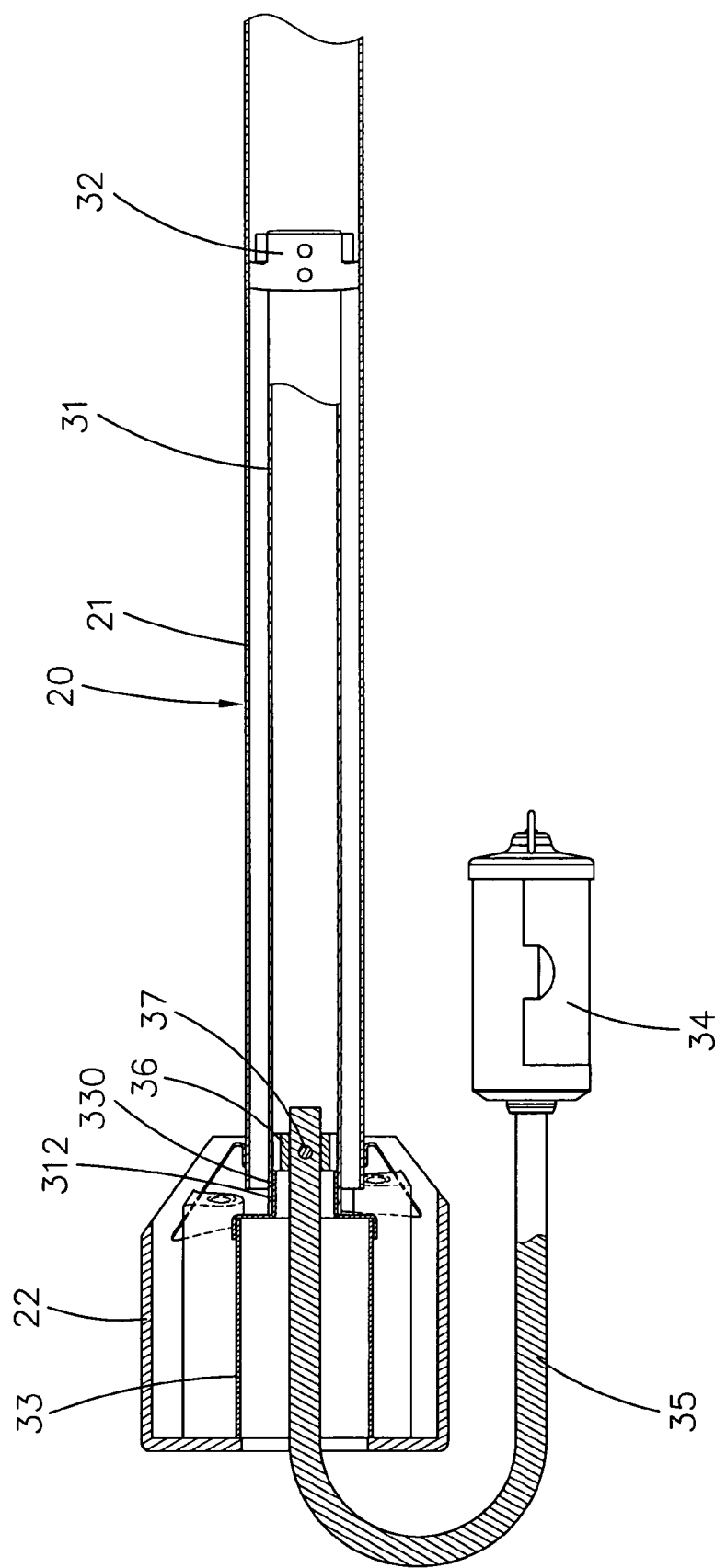
FIG. 7 is a schematic operational view of the lighting device as shown in FIG. 4.

On the contrary, as shown in FIGS. 6 and 7, the flexible pipe 35 of the lamp assembly 30 is pulled outwardly from the guide track 31 when the lighting seat 34 of the lamp assembly 30 is removed from the receiving seat 33, so that the lamp assembly 30 is expanded outwardly from the handle 21 of the handle assembly 20 for use with the user. At the same time, the slide 36 of the lamp assembly 30 is slidable in the guide track 31 by pull of the flexible pipe 35 to guide movement of the flexible pipe 35.

Figure 8:
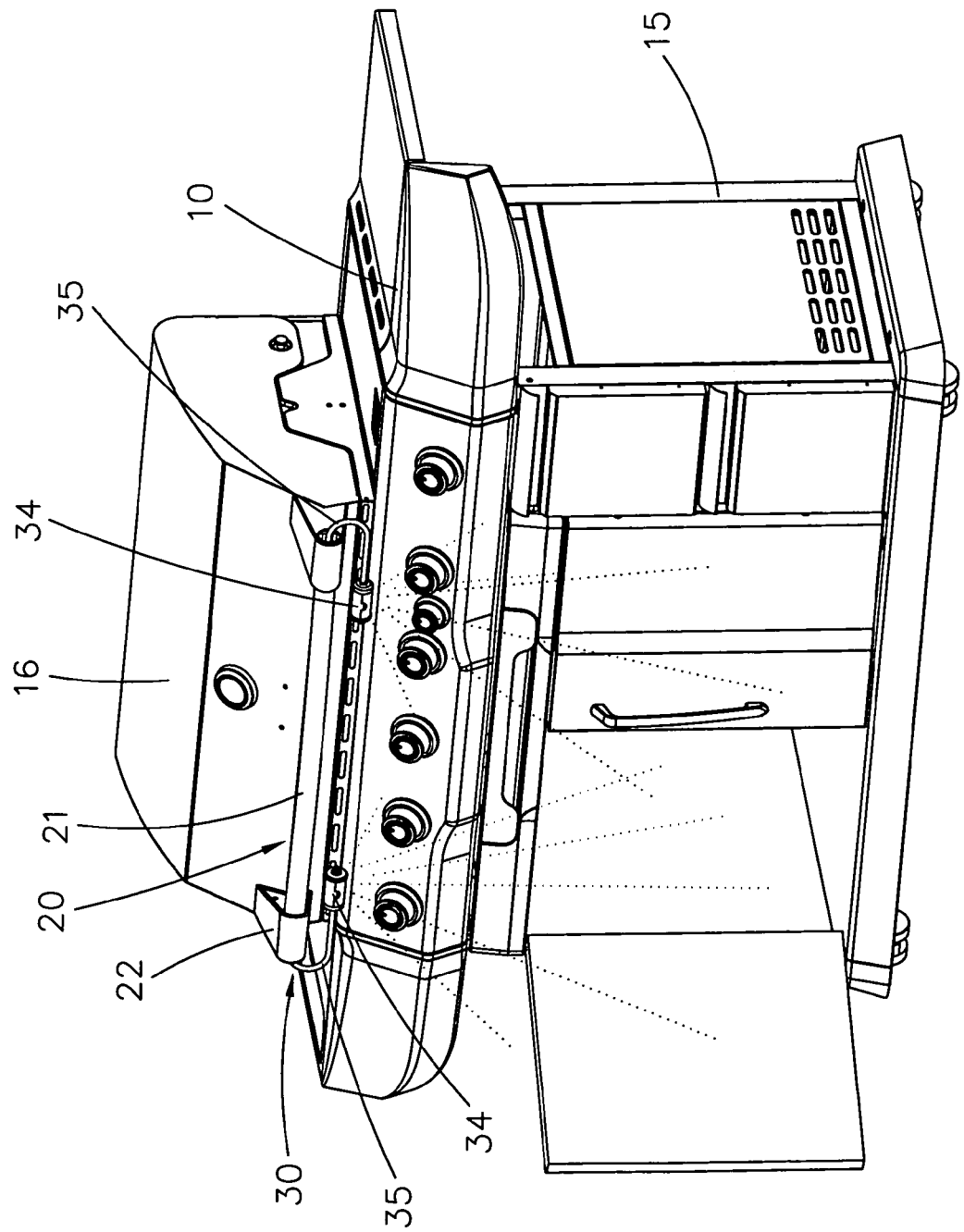
FIG. 8 is a schematic operational view of the lighting device for the barbecue as shown in FIG. 1.

As shown in FIG. 8, the lamp assembly 30 is expanded outwardly from the handle 21 of the handle assembly 20 to provide an illuminating effect.

Figure 9:
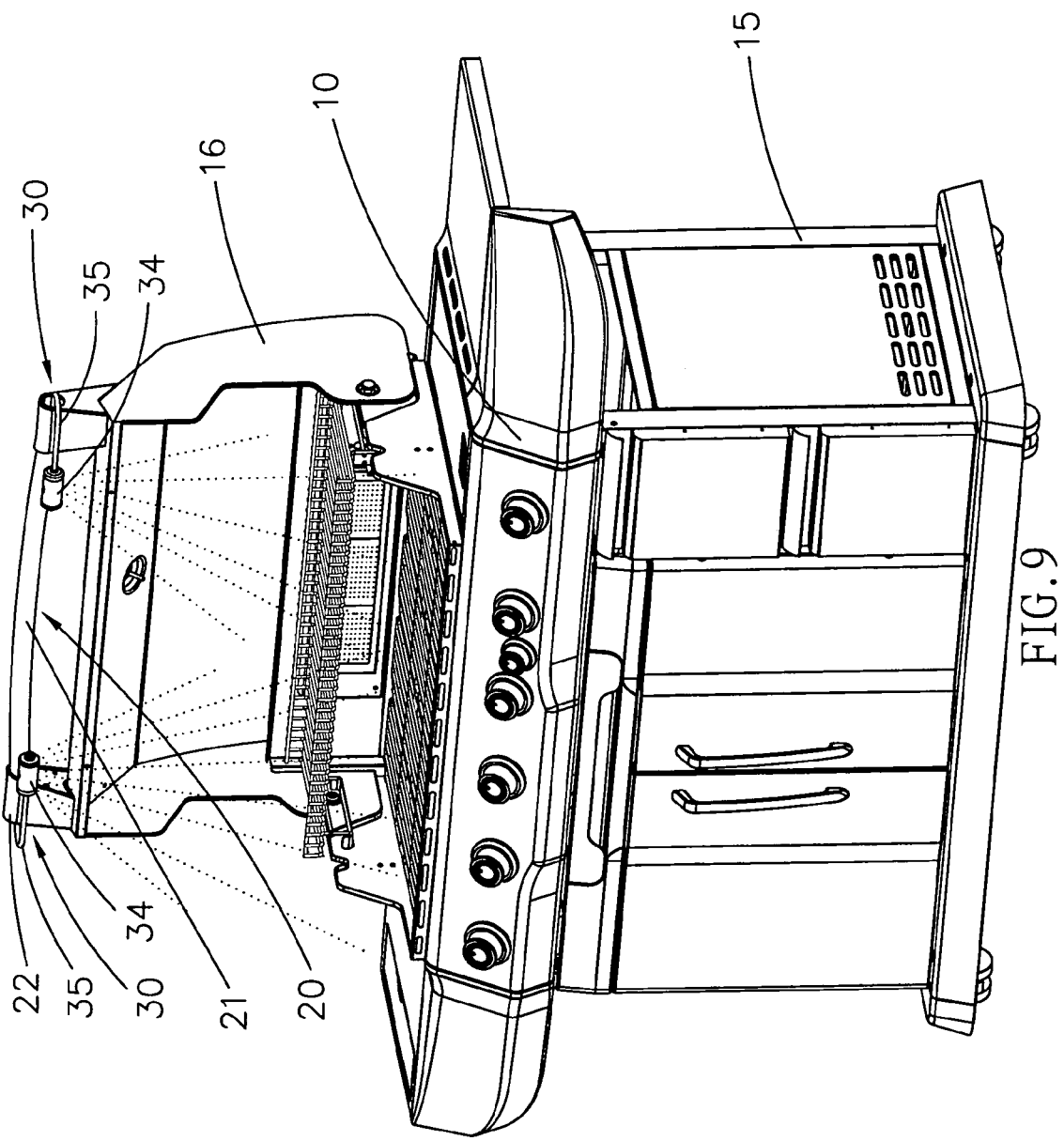
FIG. 9 is a schematic operational view of the lighting device for the barbecue as shown in FIG. 1.

As shown in FIG. 9, the lid 16 of the barbecue stove is pivoted outwardly relative to the stove body 10.

Accordingly, the lamp assembly 30 is retracted into and stored in the handle assembly 20 when not in use, so that the lamp assembly 30 does not occupy any space, thereby facilitating a user storing the lamp assembly 30. In addition, the flexible pipe 35 of the lamp assembly 30 is pulled outwardly from the guide track 31, so that the lamp assembly 30 is expanded outwardly from the handle assembly 20 easily and quickly, thereby facilitating the user storing the lamp assembly 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A lighting device, comprising:
    a handle assembly;
    a lamp assembly retractably mounted on the handle assembly; wherein:
    the handle assembly includes two spaced fixing seats, and an elongate hollow handle mounted between the fixing seats and having two ends each inserted into a respective fixing seat;
    the lamp assembly includes a guide track mounted in the handle of the handle assembly, a slide slidably mounted in the guide track, a receiving seat mounted on a respective fixing seat of the handle assembly, a lighting seat detachably mounted in the receiving seat, and a flexible pipe movably mounted in the guide track and having a first end attached to the lighting seat to move with the lighting seat and a second end attached to the slide to move the slide;
    the handle assembly further includes two cover plates each mounted in a respective fixing seat and each rested on a respective end of the handle to limit a position of the handle.

2. The lighting device of claim 1, wherein each of the fixing seats of the handle assembly has an open inner face to receive the respective cover plate and to allow insertion of the respective end of the handle.

3. The lighting device of claim 1, wherein the lamp assembly is retractably mounted in at least one end of the handle of the handle assembly.

4. The lighting device of claim 1, wherein the lamp assembly is retractably mounted in each of the two ends of the handle of the handle assembly.

5. The lighting device of claim 1, wherein the guide track of the lamp assembly has a hollow shape.

6. The lighting device of claim 1, wherein the receiving seat of the lamp assembly has a hollow shape.

7. The lighting device of claim 1, wherein the guide track of the lamp assembly has a square cross-sectional profile, and the slide of the lamp assembly has a square cross-sectional profile so that the slide is movable in and not rotatable relative to the guide track.

8. The lighting device of claim 1, wherein the lighting seat of the lamp assembly has a first end secured to the first end of the flexible pipe and a second end protruded outwardly from the respective fixing seat of the handle assembly.

9. The lighting device of claim 1, wherein the slide of the lamp assembly has a peripheral wall formed with a transverse through hole, the second end of the flexible pipe of the lamp assembly is extended through the slide and has a peripheral wall formed with a transverse through bore, and the lamp assembly further includes a fixing pin extended through the through hole of the slide and the through bore of the flexible pipe to attach the slide to the flexible pipe.

10. The lighting device of claim 1, wherein the flexible pipe of the lamp assembly is fully hidden in the guide track when the lighting seat of the lamp assembly is mounted in the receiving seat, so that the lamp assembly is retracted into and stored in the handle of the handle assembly when not in use.

11. The lighting device of claim 1, wherein the flexible pipe of the lamp assembly is pulled outwardly from the guide track when the lighting seat of the lamp assembly is removed from the receiving seat, so that the lamp assembly is expanded outwardly from the handle of the handle assembly.

12. The lighting device of claim 1, wherein the lighting seat of the lamp assembly contains a light emitting member, a power supply and a switch.

13. The lighting device of claim 1, wherein the lighting device is mounted on a barbecue stove.

14. The lighting device of claim 13, wherein the barbecue stove includes a stove body, and a lid removably mounted on a top of the stove body, and the handle assembly is mounted on the lid of the barbecue stove.

15. The lighting device of claim 14, wherein each of the fixing seats of the handle assembly is secured on the lid of the barbecue stove.

16. A lighting device, comprising:
    a handle assembly;
    a lamp assembly retractably mounted on the handle assembly; wherein:

the handle assembly includes two spaced fixing seats, and an elongate hollow handle mounted between the fixing seats and having two ends each inserted into a respective fixing seat;

the lamp assembly includes a guide track mounted in the handle of the handle assembly, a slide slidably mounted in the guide track, a receiving seat mounted on a respective fixing seat of the handle assembly, a lighting seat detachably mounted in the receiving seat, and a flexible pipe movably mounted in the guide track and having a first end attached to the lighting seat to move with the lighting seat and a second end attached to the slide to move the slide;

the guide track of the lamp assembly has a first end fixed in an inner wall of a mediate portion of the handle by a fixing plate.

17. The lighting device of claim 16, wherein the receiving seat of the lamp assembly has a first end inserted into a second end of the guide track and an open second end protruded outwardly from the respective fixing seat of the handle assembly to receive the lighting seat.

18. The lighting device of claim 17, wherein the slide of the lamp assembly is slidable in the guide track to rest on the first end of the receiving seat to prevent the flexible pipe and the lighting seat from being detached from the handle of the handle assembly.

\* \* \* \* \*